Sept. 11, 1945.   L. A. GOODMAN   2,384,462
REINFORCED ARTIFICIAL CASING FOR FOOD PRODUCTS
Filed Feb. 12, 1942
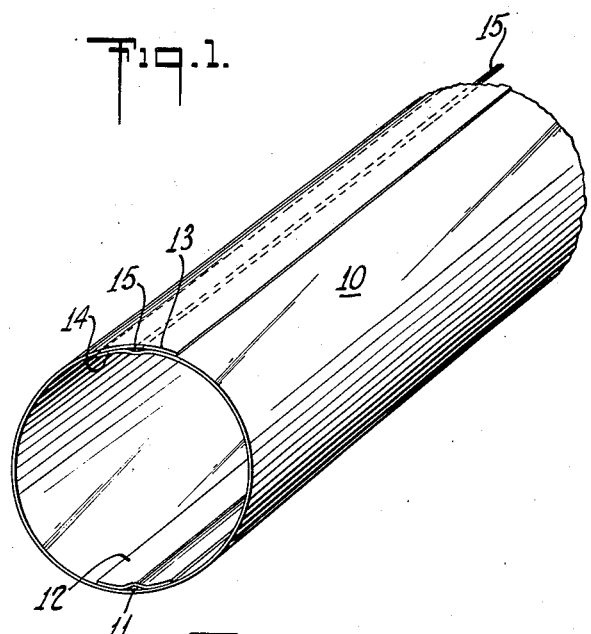
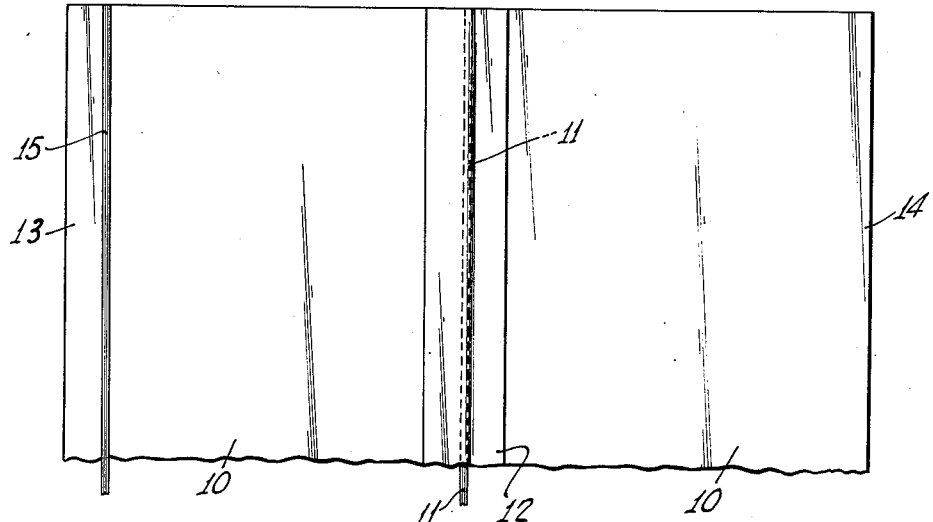
INVENTOR
LEO. A. GOODMAN
BY
ATTORNEY Patented Sept. 11, 1945

2,384,462

UNITED STATES PATENT OFFICE 2,384,462

REINFORCED ARTIFICIAL CASING FOR FOOD PRODUCTS

Leo A. Goodman, Brooklyn, N. Y., assignor of one-half to Marcleph & Co. Inc., Brooklyn, N. Y., a corporation of New York Application February 12, 1942, Serial No. 430,538

4 Claims. (Cl. 99—176)

This invention relates to improvements in artificial casings, and more particularly to casings for sausage or the like, which casings are made of material that is reinforced against extension in one direction.

In carrying out this invention I utilize the materials disclosed in my co-pending application Serial No. 387,713, filed April 9, 1941. In that application I describe the use of certain materials of the class known as "elastomers" as casings or containers for perishable food products such, for example, as sausage, fowl, seafood or dairy products. Such products are commonly processed by heat treatment after they have been placed in their casings.

As pointed out in my aforesaid application, such elastomers may be considerably stretched under the influence of heat below the plastic point of the material, and then when allowed to cool will become set in stretched condition. They are, however, capable of contracting to substantially their original dimensions when subsequently reheated above the temperature at which extension took place. These qualities make the material exceptionally suitable for use as a food casing since after the casing has been stuffed in such set-stretched condition, and subjected to heat treatment in order to process the food content, the potential contractive force in the material will cause it to shrink tightly against the outer surface of the food content and conform itself to the shape thereof.

In my said application I have pointed out that the elastomers suitable for use as casings may be of several classes. Of these, the best suited for the purpose are stabilized hydrohalogen butadiene derivatives, and certain of the so-called "elastoplastics." Of the first, may be mentioned films of stabilized rubber hydrochloride, known under the trade name of "Pliofilm," and stabilized asymmetrical amorphous rubber hydrochloride. Of the second, may be mentioned such materials as plasticized polyvinylchloride, plasticized "Formvar" (copolymer of vinylacetate and formaldehyde), or a mixture of plasticized polyvinylchloride and plasticized "Formvar."

Of these materials, I prefer to use stabilized rubber hydrochloride, known as "Pliofilm," but it is to be understood that any suitable material of the general class of elastomers may be used that has the property of returning to its original or substantially to its original dimensions, under the influence of heat, after having been initially set-stretched.

These elastomers when cool are substantially nonstretchable and have great tensile strength. However, during the heat treatment of the content in the casing, which is usually done by hanging the casing up at one end, or upon handling the heated casing with its content, the casing tends to stretch longitudinally due to the weight of the content.

The present invention has for its principal object to overcome this objection by the provision of reinforcing means for preventing stretch or extension of the casing longitudinally by the weight of its content, when the content and the casing are heated during processing of the content, or from any other cause. More generally, the object of the invention is to provide means for preventing stretch of the material in a given direction while permitting it to expand in other directions.

The invention will appear more fully from the following description thereof, reference being had to the accompanying drawing, in which:

Figure 1 is a perspective view of a tubular casing embodying the invention; and

Fig. 2 is a view of the casing laid flat.

In the manufacture of the casing I use a sheet 10 of the elastomer, preferably a sheet of Pliofilm, of suitable size to form a tube of the desired diameter, which sheet is laid flat on any suitable support. A rib or reinforcing element 11 is laid on the sheet 10 centrally and longitudinally thereof. The element 11 may be composed of several strands of thin yarn, preferably cotton, which are coherently combined in the form of a flat tape by impregnating and coating the yarns with a solution formed by dissolving a quantity of the same elastomer of which the sheet is composed in a suitable solvent, and then evaporating the solvent. The resultant reinforcing element is flexible and unstretchable lengthwise. A narrow strip 12, preferably of the same elastomer material, is laid over the reinforcing element 11 and autogenously welded thereto and to the underlying sheet 10.

The sheet 10 is then formed into a tube with the edges 13 and 14 of the sheet in overlapping relation. A second reinforcing element or rib 15 which is of the same character as the element 11 is placed between the overlapping edges 13 and 14 and the latter are autogenously welded to one another and to the element 15 to hold the sheet in tubular form and to secure the reinforcing element 15 in place. Such welding may be effected by heat and pressure, the heat being sufficient to render at least one of the overlapping edges plastic and tacky so that it will adhere to the other, as well as to the reinforcing element.

The reinforcing elements 11 and 15 extend longitudinally of the tube, at diametrically opposite points. I have shown only two reinforcing elements, but it is to be understood that a greater number may be used if desired, in which event the elements should be arranged parallel to one another and preferably spaced equal distances apart.

While I prefer to employ reinforcing elements made as herein described, since I find that they have considerably increased strength, it is within the scope of my invention to use other reinforcements such as narrow tapes or cords of any suitable flexible, relatively unstretchable, material.

Furthermore, instead of autogenously welding the reinforcing elements in place and securing the overlapped edges together, any suitable solvents which would render the material tacky or adhesive may be used for this purpose.

What I claim is:

1. A sausage casing, comprising a tube formed of an elastomer that is stretchable under heat, and a plurality of flexible, relatively unstretchable, reinforcing elements extending longitudinally of the tube and adhesively attached thereto interiorly throughout its entire length in parallel relation at substantially equally spaced points to prevent undue stretching of the tube lengthwise upon heating the tube.

2. A sausage casing, comprising a film of elastomer formed into a tube, and a pair of flexible, relatively unstretchable reinforcing elements adhesively attached to the interior surface of the tube throughout its entire length at substantially diametrically opposite points.

3. A reinforced sausage casing comprising a sheet of rubber hydrochloride formed into a tube having overlapped welded longitudinal edges, said tube being stretchable when heated, a substantially unstretchable flexible reinforcing element confined between said overlapped edges, a strip of rubber hydrochloride welded to the tube substantially parallel and diametrically opposite to its overlapped edges, and a second substantially unstretchable flexible reinforcing element confined between the tube and the strip, said reinforcing elements forming a unitary part of the casing to prevent it from stretching lengthwise when heated.

4. A reinforced sausage casing comprising a sheet of elastomer material formed into a tube having overlapped adhesively united longitudinal edges, said tube being stretchable when heated, a substantially unstretchable flexible reinforcing element confined between said overlapped edges, a strip of elastomer adhesively united to the tube substantially parallel to its overlapped edges, and a second substantially unstretchable flexible reinforcing element confined between the tube and the strip, said reinforcing elements forming a unitary part of the casing to prevent it from stretching lengthwise when heated.

LEO A. GOODMAN.